Figure 1:
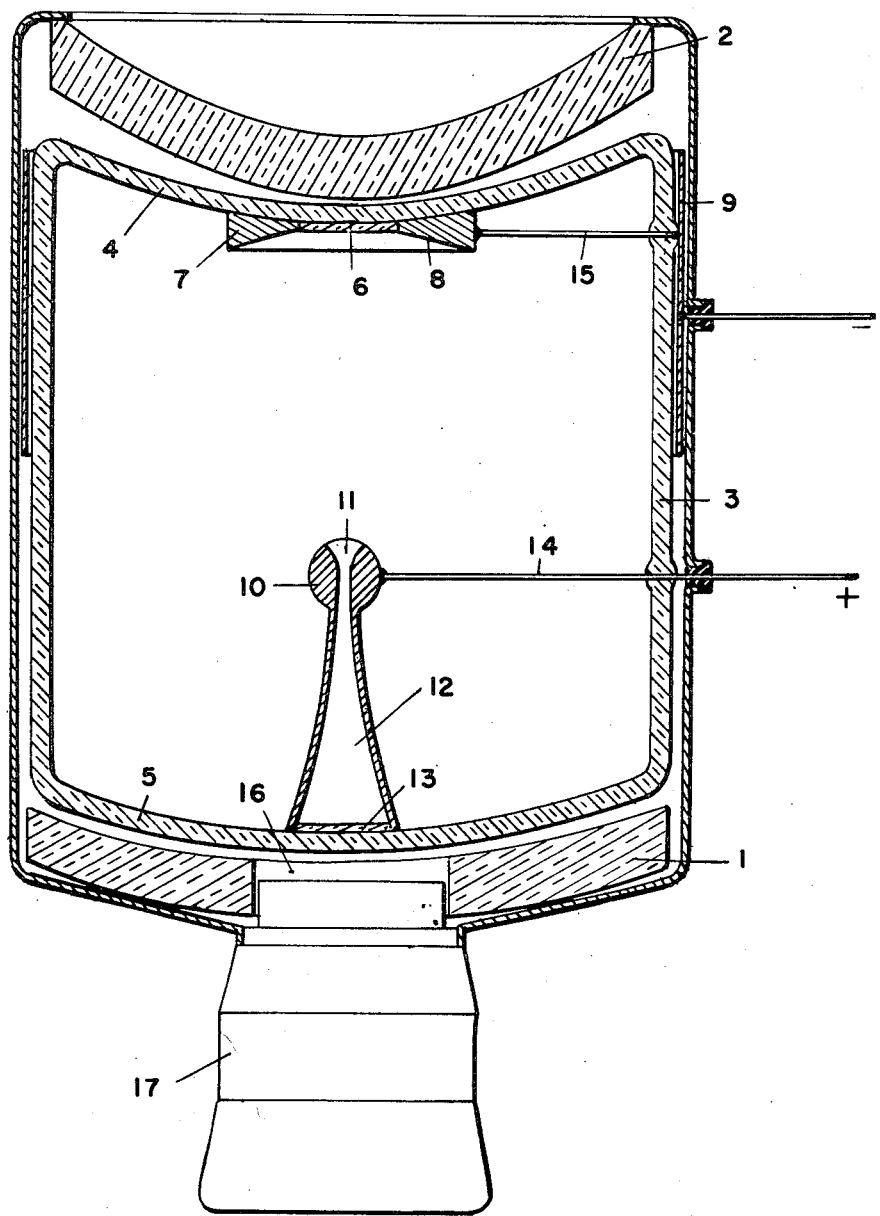

July 13, 1954   A. BOUWERS   2,683,816
SCHMIDT LIGHT AMPLIFIER
Filed March 13, 1950   2 Sheets-Sheet 1

INVENTOR
ALBERT BOUWERS

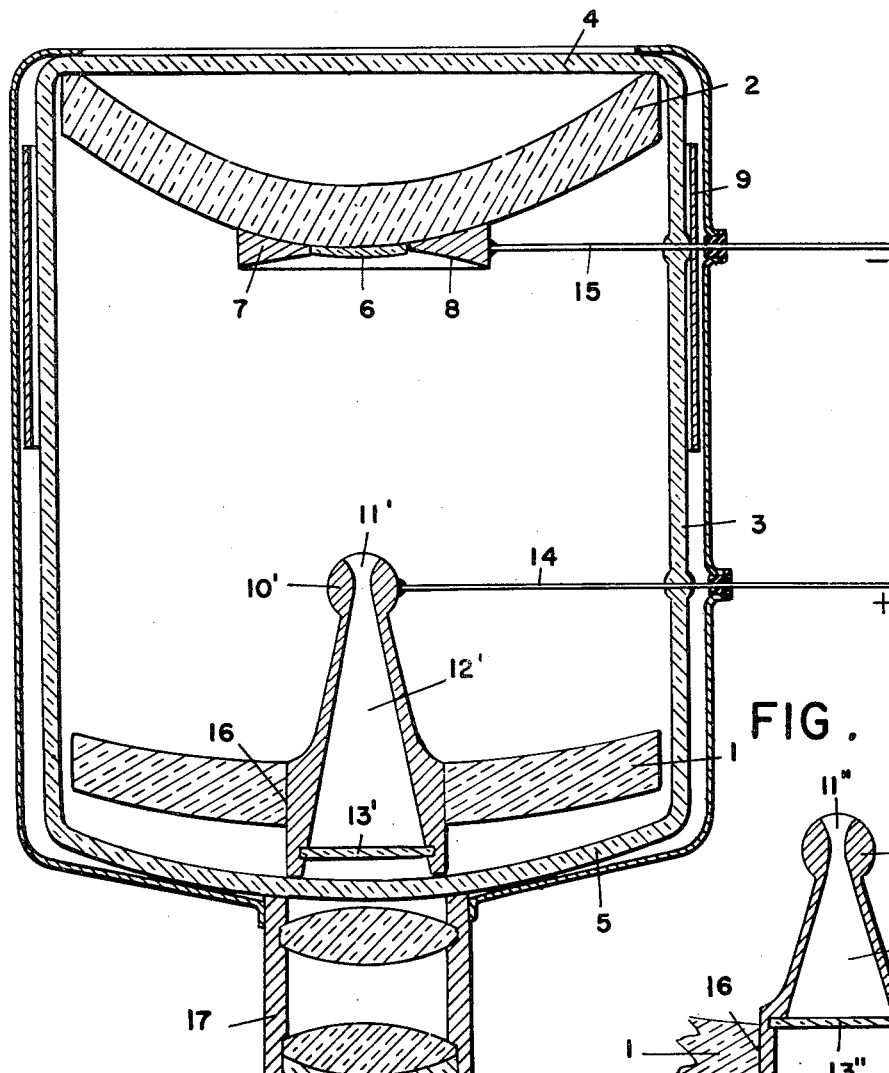
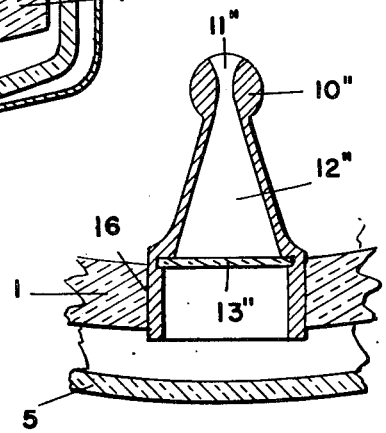

Patented July 13, 1954

2,683,816

UNITED STATES PATENT OFFICE 2,683,816

SCHMIDT LIGHT AMPLIFIER

Albert Bouwers, Delft, Netherlands, assignor to N. V. Optische Industrie "de Oude Delft," Delft, Netherlands Application March 13, 1950, Serial No. 149,266

Claims priority, application Netherlands March 31, 1949

6 Claims. (Cl. 250—213)

The invention relates to an electron-optical apparatus for visual or photographic observation of objects by means of optical rays, the rays emanating from the objects concerned being converted in the apparatus into electron rays which, in their turn, are converted again into optical rays.

Apparatus of this kind is already known; see, for example, the article by G. A. Morton and L. E. Flory in Electronics, September 1946, about an infra-red telescope. The operation of the device described therein is such that an infra-red image of the object under observation is produced, with the use of a lens system or a mirror system according to Schmidt, on a photo-cathode of a special tube type 1P25, which photo-cathode is sensitive to infra-red rays. The photo-cathode is subsequently reproduced electron-optically on a fluorescent screen provided on the other side of the tube, this screen being observed with an eye-piece.

An object of the invention is to provide a new electron-optical device which will materially reduce the dimensions of the construction, which will enhance the light intensity and the field of view and which will provide still further improvements, and as referred to hereinafter.

A further object of the invention is to provide an apparatus for the visual and photographic observation of objects by means of light rays, comprising an evacuated tube, the front and rear end of said tube being of light transmissible material, an optical system containing a spherical concave mirror at the rear of the tube and a correcting element at the front of the tube, said concave mirror and correcting element being positioned in such a way that the optical axis of said optical system coincides with the geometric axis of said tube, a photo-cathode located on that side of said correcting element that is directed towards said mirror, a fluorescent screen centered with the optical axis and near said mirror, said fluorescent screen being so positioned that it does not intercept the beam of light rays traveling from said mirror to said photo-cathode, and projection means to enable said photo-cathode to be reproduced electron-optically on said fluorescent screen.

The apparatus according to the invention contains an optical system comprising a spherical concave mirror and a correcting element which produces an optical image of the objects under observation on a photo-cathode provided between the mirror and the correcting element, and means are provided which enable the photo-cathode, in its turn, to be reproduced electron-optically on a fluorescent screen provided on that side of the photo-cathode which is adjacent the mirror, the arrangement being such that the electron-optical reproduction is performed in a vacuous space. The terms "optical rays" and "electron-optical reproduction" are to be understood to mean here visual or non-visual electro-magnetic rays and a reproduction produced by electron rays with the use of electric or magnetic lenses or a combination thereof.

This apparatus has an important advantage relative to the infra-red telescope of the type according to Morton and Flory, since the photo-cathode is struck by the optical rays on the same side on which electron emission takes place, so that the absorption and stray loss is avoided which occurs when the photo-cathode is struck on the opposite side, as in the telescope according to Morton and Flory. It is known that under these conditions the emission of the photo-cathode is a multiple of what is obtained with a transparent photo-cathode. Furthermore, the thickness of the photo-electric layer in the apparatus according to the invention is not restricted to the very narrow limits which a transparent photo-cathode has to satisfy and by which the manufacture thereof is rendered difficult.

Furthermore, the constructional length of the present apparatus is materially shorter as compared with the infra-red telescope according to Morton and Flory in the construction comprising a Schmidt system and this is a fortiori the case if a comparison is made with their construction comprising a lens system. This is due to the fact that in the present invention the photo-cathode is provided between the mirror and the correcting element so that the optical and electron-optical reproductions take place in part or wholly within the same space.

The apparatus according to the invention may be made in different forms as shown in the drawings attached herewith.

Thus, the correcting element and the mirror may both further serve as obturating glasses for the vacuous space (Figs. 1–3), in which event the fluorescent screen may be provided, for example, on the vacuum side of the central part of the mirror, which part is not provided with a reflecting layer (Figs. 2 and 3).

As an alternative, the correcting element and the mirror may both be arranged in the vacuum.

However, in both cases there is the disadvantage that the exact mutual centering which is required for the correcting element, mirror and photo-cathode can be effected only with difficulty, since the mirror and the correcting element are required to be sealed to or within the vacuum tube containing the photo-cathode.

This difficulty may be partly avoided by providing either the correcting element or the mirror outside the vacuum as shown in Fig. 1. Thus, in sealing, care must only be taken to ensure good centering of the photo-cathode with respect to the sealed part, whilst the part arranged outside vacuum may be centered separately, by means which are known per se.

Both the mirror and the correcting element may be, with advantage, provided outside the vacuum (Fig. 1). The difficulty of centering is thus completely avoided, since the mirror and the correcting element may be centered individually relatively to the photo-cathode. In the forms of construction described, the vacuous space must be provided with one or two obturating glasses of sufficient optical quality, but they may be flat or curved glasses of uniform thickness, the centering of which is much less critical than that of the correcting element and the mirror.

One form of construction of the apparatus as in Fig. 1 for example is characterised in that the surface of the correcting element or of the obturating glass which is adjacent the spherical concave mirror carries the photo-cathode. It is preferred that the photo-cathode should be screened against direct optical rays by a metallic conductive deposit on the surface of the correcting element or the obturating glass, which deposit also carries the photo-electric layer proper and may furthermore serve to connect the photo-cathode with the other parts of the electric circuit bringing about the electron-optical reproduction. An efficacious arrangement of the photo-cathode is thus obtained in a simple manner.

The correcting element may be made in different forms, for example as a Schmidt plate or as a meniscus lens according to United States Patent No. 2,492,461. The image produced on the fluorescent screen may be fixed photographically or be viewed directly through an eye-piece.

An electron lens which is particularly adapted to the apparatus according to the invention (Figs. 1-3) is characterised in that the positive electrode is constituted by a substantially spherical perforated part having secured to it a conical tube of conductive material which, at the other end, terminates at or near the fluorescent screen.

It is thus ensured that the electrons, after having passed through the bore in the spherical part of the positive electrode, travel in a fieldless space. Furthermore the advantage is obtained that the electron-optical system satisfies the condition of being wholly located outside of the reproducing beams of rays, so that light is not intercepted thereby.

Other and further characteristics and objects of the present invention will appear from the more detailed description below and drawings, it being understood that such more detailed description is given by way of illustration and explanation only and not by way of limitation, since various changes may be made by those skilled in the art without departing from the scope and spirit of the present invention.

In connection with that more detailed description, there is shown in the drawings, in Fig. 1, a sectional view of the apparatus wherein the correcting element and mirror are both wholly outside of the evacuated photo-cathode tube, Fig. 2, a sectional view of the apparatus in which the mirror and correcting element are both wholly inside the evacuated space of the photo-cathode tube, and Fig. 3, a detail of a modification of the positioning arrangement of the fluorescent screen with respect to the mirror.

As shown in the figs. of the drawings, the optical system comprises the spherical mirror 1 and the correcting element 2. The boundary surfaces of the mirror and of the meniscus-shaped correcting element are concentric. They are separated by the vacuum tube 3, which is bounded on each side by the obturating glasses 4 and 5, each of these glasses being a transparent glass which is vacuum sealed. The inner side of the obturating glass 4 in Fig. 1 carries the photo-cathode 6, the surface of which is concentric with the surfaces of the mirror and the meniscus. As is well known, the entire photo-cathode tube need not be made of optically suitable glass since the optical characteristics of the device are determined by the optical quality of the obturating glasses 4 and 5 so that the remainder of the structure may be of metal in accordance with the conventional construction.

The photo-cathode tube is surrounded by an annular conductive body 7 having a concave surface 8. The body 7 is connected in a conductive manner to the cylinder 9, which is likewise of conductive material. As mentioned above, the correcting element and mirror may both be arranged in vacuum as shown in Figs. 2 and 3 and the annular conductive body 7 which surrounds the photo-cathode is connected in similar manner to cylinder 9 as in the construction of Fig. 1. In Figs. 2 and 3, to screen against direct optical rays coming in contact with the photo-cathode as mentioned before, the photo-cathode is arranged in alignment with and directly opposite to the ball 10 as in Fig. 1.

Arranged in the tube 3 is the conductive ball 10 provided with an aperture 11, which constitutes the electron lens. This ball is secured to the light-obturating body 12.

In the form of construction shown, the body 12 is of insulating material. Under certain conditions it may, however, also be advantageous to have it made wholly or in part of conductive material. The fluorescent screen 13 which, in the apparatus shown in Fig. 1, is provided on the inner side of the obturating glass 5 may then alternatively be made as a separate obturating screen for the body as is shown in Figs. 2 and 3. The fluorescent screen 13 when made separate is in the same optical relationship in Figs. 2 and 3 to the eye-piece 17 and spherical mirror 1 as is shown in Fig. 1, these separate screens shown as 13' and 13'' in the embodiments of Figs. 2 and 3 respectively, the corresponding modification of the conductive ball shown in these figures as 10' and 10'' respectively.

The ball 10 is connected by means of the supply wire 14 to the positive terminal of a source of direct voltage, the photo-cathode 6, the body 7 and the cylinder 9 being connected through the supply wire 15 to the negative terminal of the source of voltage.

The direct voltage is 12,000 volts. The required insulation may be furnished in known manner.

The mirror 1 is provided with a central aperture 16, through which the eye-piece 17 is passed.

For example, the clear aperture of the meniscus is 60 mm. The focal length of the optical system is also 60 mm. so that a system of high light intensity is obtained having a relative aperture of 1:1. The diameter of the active portion of the photo-cathode is 10 mm. The distance between the cathode 6 and the ball 10 is 32 mm. and that between the ball 10 and the fluorescent screen 13 is 24 mm.

The light rays emanating from the object pass successively the meniscus and the two obturating glasses 4 and 5 in Figs. 1-3 and are subsequently reflected on the mirror 1 to reach via the obturating glass 5 the photo-cathode 6. An inverted image of the object is thus produced on the photo-cathode. The latter emits electrons due to the light rays striking it, which electrons are in an electric field, the equipotential surfaces of which are approximately concentric with the surface 8 of ring 7, and which surface in turn is concentric with the surface of the ball 10. By giving the potential zero to the photo-cathode and the ring 7 and the potential 12,000 volts to the ball, the electrons released from the photo-cathode are accelerated towards the ball, passing through the aperture 11 into the space inside the body 12. Consequently, on the fluorescent screen there is produced an inverted image of the photo-cathode which is reduced to ¾ of its size, i. e. an upright image of the object is seen through the eye-piece. The latter has a focal length of 30 mm., so that the total magnification of the instrument is 1.5 $x$ in this example.

Direct light rays cannot reach the fluorescent screen, these rays being screened by the body 10.

The concentricity of the equipotential surfaces is enhanced by the conductive cylinder 9, which is at the same potential as the ring 7 and the photo-cathode 6. For the same purpose the photo-cathode is so positioned that its surface is tangential to the surface 8 of ring 7, if the latter surface is imagined to be extended.

The instrument is compact in structure, light in weight and produces a sharp and bright image of the object. This result is obtained with a combination of a very simple optical system with an electrostatic electron lens which is also very simple.

The manufacture of the system is comparatively easy, since the mirror and the meniscus may be centered individually with respect to the photo-cathode. The obturating glasses 4 and 5 are thin ground and polished discs of constant thickness, which may be secured by sealing in a simple manner, the centering of these glasses being much less critical than that of the mirror and the meniscus.

What I claim is:

1. An apparatus for the visual and photographic observation of objects by means of light rays comprising, an evacuated tube, the front and rear ends of said tube being of light transmissible material, an optical system containing a spherical concave mirror at the rear of the tube and a correcting element at the front of the tube, the optical axis of said concave mirror and correcting element being positioned to coincide with the geometric axis of said tube, a photo-cathode within said tube located on that side of said correcting element which faces said mirror, a fluorescent screen in said tube centered with said optical axis which is located immediately adjacent said mirror and opposite said photo-cathode so that said screen does not intercept the beam of light rays travelling from said mirror to said photo-cathode, the light transmissible material at the rear end of said tube being of sufficient optical quality so that the light rays after reflection from said mirror traverse said material in a substantially perpendicular direction, and projection means in said tube to enable said photo-cathode to be reproduced electron-optically on said fluorescent screen, said electron-optical projection being accomplished in the evacuated space of the tube.

2. An apparatus as in claim 1 wherein said spherical concave mirror and said correcting element are both wholly outside said tube.

3. An apparatus as in claim 1 wherein said mirror is arranged wholly outside said tube.

4. An apparatus as in claim 1 wherein said mirror and said correcting element are both wholly inside said tube.

5. An apparatus as in claim 1 wherein said projection means includes a positive electrode which is constituted by a substantially spherical perforated portion which is secured to a conductive material, and wherein the other end of said opaque tube terminates at the fluorescent screen.

6. An apparatus as in claim 2 wherein the photo-cathode is screened against direct optical rays by a metallic conductive surface coating on the surface of the front end of the tube, which coating carries the photo-electric layer and connects the photo-cathode to the electric circuit of the apparatus.

References Cited in the file of this patent

UNITED STATES PATENTS

| Number | Name | Date |
| --- | --- | --- |
| 2,131,185 | Knoll | Sept. 27, 1938 |
| 2,163,545 | Clothier et al. | June 20, 1939 |
| 2,219,113 | Ploke | Oct. 22, 1940 |
| 2,258,436 | Von Ardenne | Oct. 7, 1941 |
| 2,440,735 | Cawein | May 4, 1948 |
| 2,458,132 | Baker | Jan. 4, 1949 |
| 2,490,740 | Nicoll | Dec. 6, 1949 |

OTHER REFERENCES

"Achievements in Optics;" A. Bouwers, Elsevier Publishing Co., Inc., New York, 1946, page 56.